(12) United States Patent
Kim

(10) Patent No.: US 11,296,639 B2
(45) Date of Patent: Apr. 5, 2022

(54) INVERTER

(71) Applicant: LSIS CO., LTD., Gyeonggi-do (KR)

(72) Inventor: Hyo-Jin Kim, Gyeonggi-do (KR)

(73) Assignee: LSIS CO., LTD., Anyang-si (KR)

( * ) Notice: Subject to any disclaimer, the term of this patent is extended or adjusted under 35 U.S.C. 154(b) by 409 days.

(21) Appl. No.: 15/384,883

(22) Filed: Dec. 20, 2016

(65) Prior Publication Data
US 2017/0207741 A1    Jul. 20, 2017

(30) Foreign Application Priority Data

Jan. 18, 2016 (KR) .................. 10-2016-0006061

(51) Int. Cl.
| | |
|---|---|
| *H02P 27/06* | (2006.01) |
| *H02P 27/04* | (2016.01) |
| *H02J 3/38* | (2006.01) |
| *H02P 6/14* | (2016.01) |

(52) U.S. Cl.
CPC .............. *H02P 27/06* (2013.01); *H02J 3/385* (2013.01); *H02P 6/14* (2013.01); *H02P 27/047* (2013.01)

(58) Field of Classification Search
CPC .............. H02P 27/06; H02P 6/14; H02J 3/385
USPC ....................................................... 318/503
See application file for complete search history.

(56) References Cited

U.S. PATENT DOCUMENTS

| | | | |
|---|---|---|---|
| 6,275,403 B1 * | 8/2001 | McNulty ........... | H02M 7/53875 363/131 |
| 6,590,793 B1 | 7/2003 | Nagao et al. | |
| 2005/0068001 A1 * | 3/2005 | Skaug ................... | H02M 5/458 318/807 |
| 2006/0215426 A1 * | 9/2006 | Ely ......................... | H02M 7/48 363/49 |
| 2007/0290651 A1 * | 12/2007 | McNulty .................. | F03G 6/00 318/800 |

(Continued)

FOREIGN PATENT DOCUMENTS

| | | |
|---|---|---|
| CN | 101005267 A | 7/2007 |
| CN | 101841256 A | 9/2010 |

(Continued)

OTHER PUBLICATIONS

Korean Office Action dated Jan. 17, 2017 in Corresponding with the counterpart Korean Patent Application No. 10-2016-0006061.

(Continued)

*Primary Examiner* — Eduardo Colon Santana
*Assistant Examiner* — Devon A Joseph
(74) *Attorney, Agent, or Firm* — K&L Gates LLP

(57) ABSTRACT

The present invention relates to an inverter which is capable of adjusting an output frequency of a three-phase voltage output to a motor based on a result of comparison in magnitude between the minimum operating voltage of the motor and a DC link voltage applied to a DC link. The inverter includes: a measurement part configured to measure a DC link voltage applied to a DC link; a conversion part configured to convert the DC link voltage into a three-phase voltage and output the three-phase voltage to the motor; and a control part configured to make comparison in magnitude between the DC link voltage and the minimum operating voltage of the motor and adjust an output frequency of the three-phase voltage based on a result of the comparison.

5 Claims, 5 Drawing Sheets

(56) References Cited

U.S. PATENT DOCUMENTS

| | | | | |
|---|---|---|---|---|
| 2008/0187298 A1* | 8/2008 | Holden | ............... | F04B 49/06 |
| | | | | 388/811 |
| 2010/0275628 A1* | 11/2010 | Moseley | ............ | F25B 49/022 |
| | | | | 62/228.1 |
| 2011/0255307 A1* | 10/2011 | Kim | ............ | H02J 3/381 |
| | | | | 363/13 |
| 2013/0154536 A1* | 6/2013 | Park | ............ | H02P 27/04 |
| | | | | 318/503 |
| 2014/0125264 A1* | 5/2014 | Nakamura | ............ | H02P 6/10 |
| | | | | 318/400.23 |
| 2014/0126259 A1 | 5/2014 | Inoue | | |
| 2018/0278193 A1* | 9/2018 | Gurkaynak | ............ | H02M 3/158 |

FOREIGN PATENT DOCUMENTS

| | | |
|---|---|---|
| CN | 103534932 A | 1/2014 |
| CN | 103762937 A | 4/2014 |
| JP | H5-265582 A | 10/1993 |
| JP | H1164393 A | 3/1999 |
| JP | 2002136101 A | 5/2002 |
| JP | 4571480 B2 | 10/2010 |
| JP | 4581603 A | 11/2010 |
| JP | 4715373 A | 7/2011 |
| JP | 2013-126371 A | 6/2013 |
| JP | 2015116074 A | 6/2015 |
| JP | 2015-208106 A | 11/2015 |

OTHER PUBLICATIONS

Japanese Office Action dated Sep. 5, 2017 in connection with the counterpart Japanese Patent Application.
Korean Notice of Allowance dated Sep. 20, 2017 in connection with the counterpart Korean Patent Application.
Search Report dated Jun. 6, 2017 issued in corresponding European Application No. 16198585.8.
Office Action dated Jun. 12, 2017 issued in corresponding Korean Application No. 10-2016-0006061.
Chinese Office Action for related Chinese Application No. 201611037881.X; action dated Oct. 8, 2018; (6 pages).

* cited by examiner

INVERTER

CROSS REFERENCE TO RELATED APPLICATION

This application claims the benefit of Korean Patent Application No. 10-2016-0006061, filed on Jan. 18, 2016, entitled "INVERTER", which is hereby incorporated by reference in its entirety into this application.

BACKGROUND

1. Technical Field

The present invention relates to an inverter and more particularly, to an inverter which is capable of adjusting an output frequency of a three-phase voltage output to a motor based on a result of comparison in magnitude between the minimum operating voltage of the motor and a DC link voltage applied to a DC link.

2. Description of the Related Art

Among alternative energy sources in the future, a solar power system for converting solar energy into electric energy is in the most limelight. The solar power system is to condense sunlight through solar cells, generate electric power using an electric charge difference, and store the electric power in a battery. The electric power is converted from DC power to AC power by means of an inverter and is supplied to a load.

Such a solar power system has advantages in that it can obtain high energy efficiency only with sunlight without any separate fuel and can be used semi-permanently although it requires high initial facility costs.

Accordingly, the solar power system is being used, e.g., as a power supply system for a pump installed to supply water for drinking, fields, livestock farming and so on in remote areas where it is difficult to supply power.

Electric energy generated from solar cells has electrical characteristics significantly different from those of the traditional electric energy. More specifically, since the traditional electric energy has the linear voltage source characteristics, it maintains a constant voltage and works stably when a linear or nonlinear load is applied to a load stage.

In addition, since it has a single operating point, it always works stably under any input/output conditions. That is, when the electric energy having the linear voltage source is used, it is possible to obtain desired operation conditions irrespective of load conditions.

However, the electric energy generated from solar cells has the characteristics that a voltage and a current are nonlinearly varied depending on power output to a load through an inverter as a nonlinear voltage source.

Accordingly, conventionally, in order to control the output of the solar cells to the maximum, a maximum power point tracking (MPPT) algorithm was used to control an output voltage of the solar cells.

More specifically, conventionally, a controller for driving the MPPT algorithm and an inverter were separately provided and used to generate a control voltage value for controlling the output of the solar cells to the maximum by inputting an output voltage and output current of the solar cells to the MPPT algorithm.

Thereafter, a PID module was used to perform feedback control to allow the output voltage to be kept at the control voltage value, based on an error between the actual output voltage of the solar cells and the control voltage value.

However, when the above-mentioned MPPT algorithm is applied to an inverter of a pump receiving power from a solar power system, there is a problem that an expensive separate controller for calculating the control voltage value for controlling the output of the solar cells to the maximum has to be provided in addition to the inverter.

In addition, when the PID module included in the inverter for supplying the converted power to the pump is used to control the output voltage of the solar cells to the control voltage value, there is another problem that it is necessary to perform control of variables required for pump driving, such as a flow rate, a pressure and so on, in addition to the output voltage control, with the limited capability of the PID module included in the inverter.

SUMMARY

It is an aspect of the present invention to provide an inverter which is capable of driving a motor with the maximum power by making comparison in magnitude between a DC link voltage applied to a DC link and the minimum operating voltage of the motor and controlling an output frequency of a three-phase voltage output to the motor based on a result of the comparison.

The present invention is not limited to the above aspect and other aspects of the present invention will be clearly understood by those skilled in the art from the following description. The above and/or other aspects and advantages of the present invention will become apparent and more readily appreciated from the following description of the embodiments, taken in conjunction with the accompanying drawings. It should be understood that the objects and advantages of the present invention can be realized by features and combinations thereof set forth in the claims, In accordance with one aspect of the present invention, there is provided an inverter including: a measurement part configured to measure a DC link voltage applied to a DC link; a conversion part configured to convert the DC link voltage into a three-phase voltage and output the three-phase voltage to the motor; and a control part configured to make comparison in magnitude between the DC link voltage and the minimum operating voltage of the motor and adjust an output frequency of the three-phase voltage based on a result of the comparison.

According to the present invention, it is possible to drive a motor with the maximum power by making comparison in magnitude between a DC link voltage applied to a DC link and the minimum operating voltage of the motor and controlling an output frequency of a three-phase voltage output to the motor based on a result of the comparison.

In addition, according to the present invention, by eliminating a need for a separate controller for calculating a (maximum power point tracking (MPPT) algorithm to drive the motor with the maximum power, it is possible to drive the motor with the maximum power using only the inverter and reduce an installation space and production costs which are required by the separate controller.

Furthermore, according to the present invention, since the motor can be driven with the maximum power using only the inverter without a PID module, it is possible to utilize the PID module for control of variables required to drive the motor, such as a flow rate, a pressure and the like.

DETAILED DESCRIPTION

Figure 1:
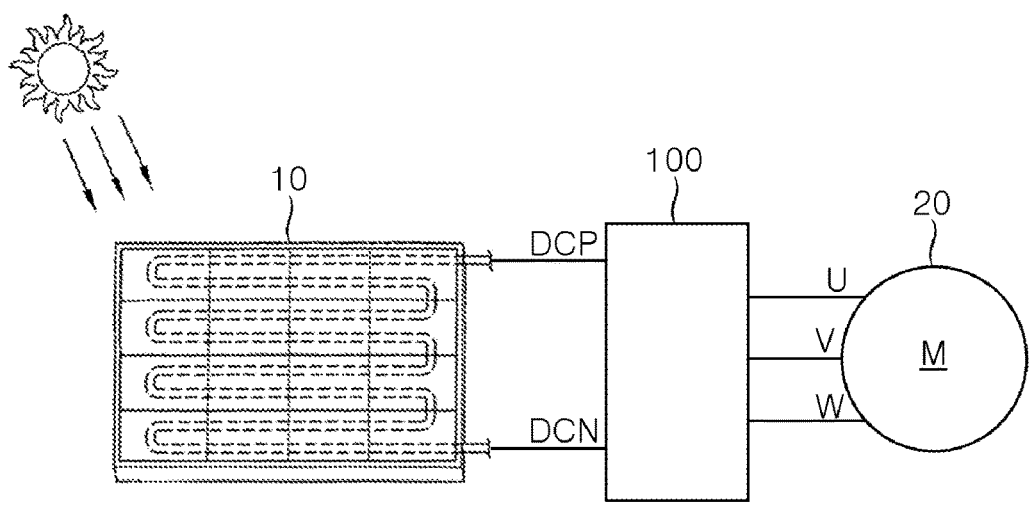
FIG. 1 is a view illustrating the configuration of connection between a solar power system, a motor pump and an inverter according to one embodiment of the present invention.

The above objects, features and advantages will become more clearly apparent from the following detailed description in conjunction with the accompanying drawings. Therefore, the technical ideas of the present invention can be easily understood and practiced by those skilled in the art. In the following detailed description of the present invention, concrete description on related functions or constructions will be omitted if it is deemed that the functions and/or constructions may unnecessarily obscure the gist of the present invention. Hereinafter, preferred embodiments of the present invention will be described in detail with reference to the accompanying drawings. Throughout the drawings, the same or similar elements are denoted by the same reference numerals.

Figure 2:
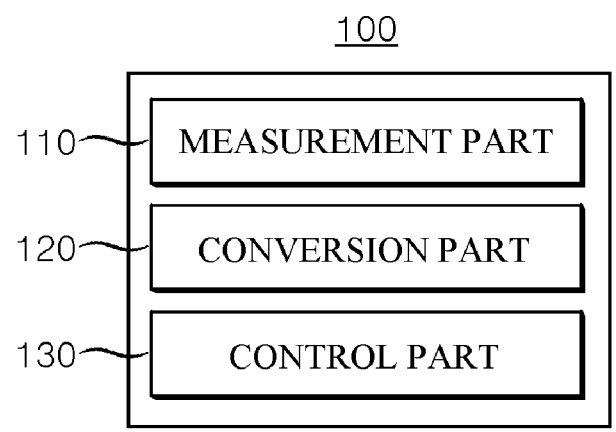
FIG. 2 is a view illustrating the configuration of the inverter according to one embodiment of the present invention.

FIG. 1 is a view illustrating the configuration of connection between a solar power system 10, a motor pump 20 and an inverter 100 according to one embodiment of the present invention. FIG. 2 is a view illustrating the configuration of the inverter 100 according to one embodiment of the present invention.

Referring to FIG. 1, the inverter 100 according to one embodiment of the present invention is configured to receive DC power generated in the solar power system 10 at its DC links DCP and DCN, convert the received DC power into AC power of a three-phase voltage, and output the AC power to the motor 20. More specifically, the DC links DCP and DCN formed in one side of the inverter 100 are connected to the solar power system 10 and a DC link voltage Vdc is applied to the DC links DCP and DCN. The AC power of the three-phase voltage is output from the other side of the inverter 100 to the motor 20.

In this embodiment, the solar power system 10 may be a power generator which includes a solar cell array (PV-array) consisting of a plurality of solar cells connected in series/parallel and supplies DC power generated from the solar cell array (PV-array) to the inverter 100.

In addition, the motor 20 may be an electric motor used for a water pump which pumps water up from low to high points.

It is here noted that the solar power system 10 and the motor 20 are those generally used in the whole industry and are not particularly limited.

Referring to FIG. 2, the inverter 100 according to one embodiment of the present invention may include a measurement part 110, a conversion part 120 and a control part 130. The inverter 100 shown in FIG. 2 is just illustrative and elements thereof are not limited to those shown in FIG. 2 but may be partially added, changed or deleted as necessary.

The measurement part 110 measures a DC link voltage Vdc applied from the solar power system 10 to the DC links DCP and DCN. In this embodiment, although not shown in the figure, a DC link capacitor for smoothing DC power generated from the solar power system 10 and storing the smoothed DC power as the DC link voltage Vdc may be connected to the DC links DCP and DCN of the inverter 100.

The DC link voltage Vdc supplied from the solar power system 10 and applied to the DC links DCP and DCN is nonlinearly changed depending on an output W of the motor 20.

In more detail, when the output frequency f of a three-phase voltage converted by the inverter 100 and supplied to the motor 20 is increased under control of the inverter 100, the output W of the motor 20 may be increased in proportion to the square of the increased output frequency f. In addition, the DC link voltage Vdc measured by the measurement part 110 may be decreased with the increase in output W of the motor 20.

The measurement part 110 may measure the DC link voltage Vdc stored in the DC link capacitor through a voltage sensor and transmit the measured DC link voltage Vdc to the control part 130 to be described later.

The conversion part 120 converts the DC link voltage Vdc into a three-phase voltage and outputs the three-phase voltage to the motor 20. More specifically, the conversion part 120 can drive the motor 20 by switching the DC link voltage Vdc smoothed and stored by the DC link capacitor to be converted into the three-phase voltage and outputting the three-phase voltage to the motor 20.

To this end, in one embodiment, the conversion part 120 may include a switching circuit consisting of a plurality of switching elements and diodes. The conversion part 120 can apply the DC link voltage Vdc to the switching circuit and convert the DC link voltage Vdc into the three-phase voltage by controlling the turn-on/off of the plurality of switching elements.

In this embodiment, the switching elements may be insulated gate bipolar transistors (IGBTs) but are not limited thereto.

It has been illustrated in the above that the conversion part 120 uses the switching circuit to convert the DC link voltage Vdc into the three-phase voltage. However, the conversion part 120 may employ other voltage conversion methods such as a voltage reference inverting method, a vector control method, a VF control method and the like as long as they can converting the DC link voltage Vdc into the three-phase voltage.

Figure 3:
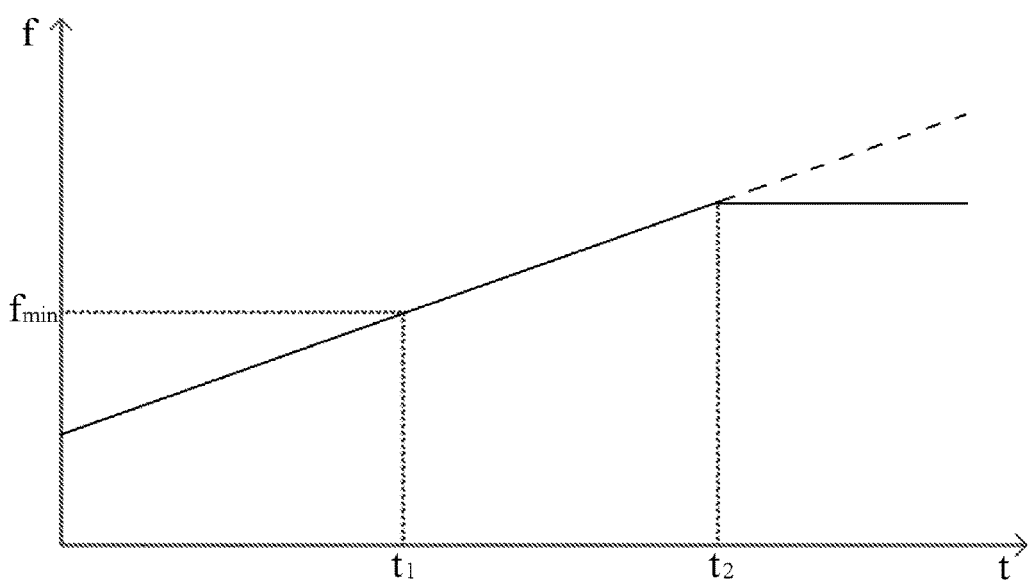
FIG. 3 is a graph showing a change in output frequency of a three-phase voltage output from the inverter according to one embodiment of the present invention to a motor with time.
Figure 4:
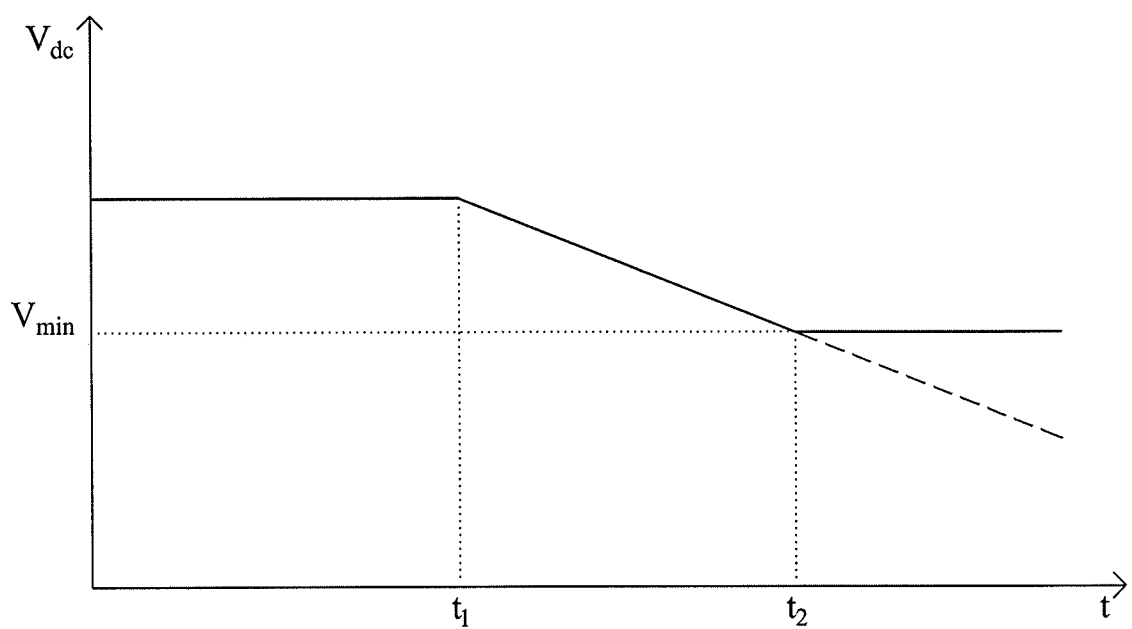
FIG. 4 is a graph showing a change in DC link voltage applied to DC links of the inverter according to one embodiment of the present invention with time.
Figure 5:
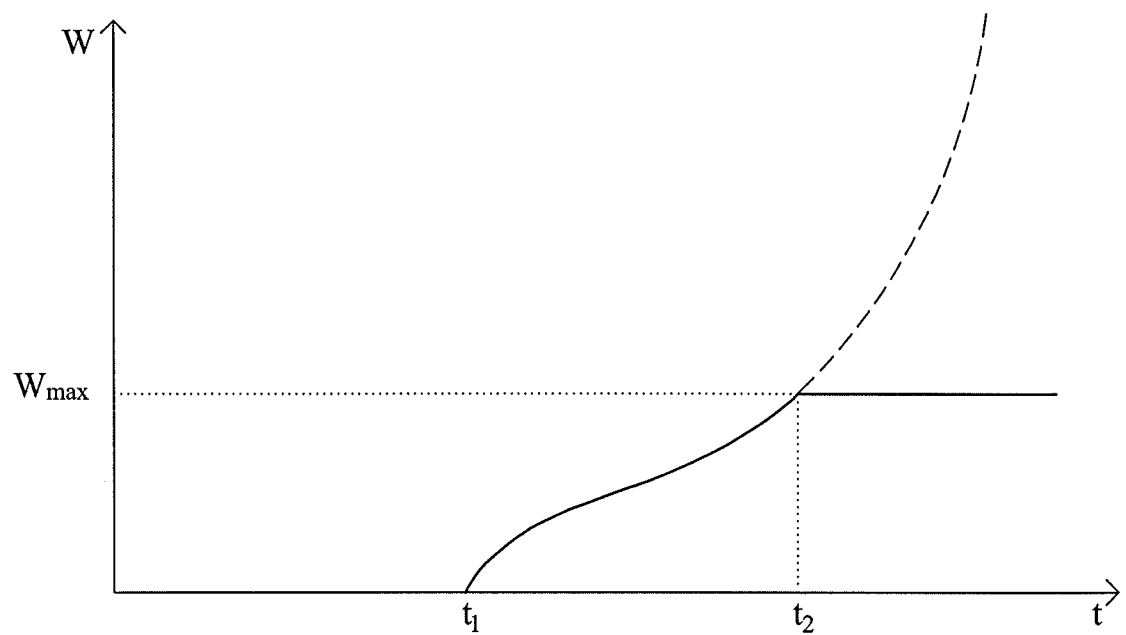
FIG. 5 is a graph showing a change in output of the motor driven by a three-phase voltage supplied from the inverter according to one embodiment of the present invention with time.

FIG. 3 is a graph showing a change in output frequency f of a three-phase voltage output from the inverter 100 according to one embodiment of the present invention to the motor 20 with time. FIG. 4 is a graph showing a change in DC link voltage Vdc applied to the DC links DCP and DCN of the inverter 100 according to one embodiment of the present invention with time. FIG. 5 is a graph showing a change in output of the motor 20 driven by a three-phase voltage supplied from the inverter 100 according to one embodiment of the present invention with time.

Hereinafter, the control part 130 will be described with reference to FIGS. 3 to 5.

The control part 130 compares the DC link voltage Vdc with the minimum operating voltage Vmin and adjusts the output frequency f of the three-phase voltage based on a result of the comparison.

At this time, the control part 130 can adjust the output frequency f of the three-phase voltage by controlling a turn-on/off operation of the plurality of switching elements included in the conversion part 120 in response to the three-phase voltage output frequency f to be adjusted.

In addition, at the time of start of the operation of the motor 20, the control part 130 adjusts the output frequency f of the three-phase voltage to the minimum operating frequency fmin.

Here, the minimum operating frequency fmin may refer to the minimum frequency value of the three-phase voltage supplied to the motor 20 to be driven. That is, the motor 20 begins to be driven when the output frequency f of the three-phase voltage supplied to the motor is equal to or higher than the minimum operating frequency fmin.

At this time, the minimum operating frequency fmin may be set differently depending on the rated specifications of the motor 20.

In a t0 to t1 interval from during which the three-phase voltage whose output frequency f is lower than the minimum operating frequency fmin, as shown in FIG. 3, the output W of the motor 20 may be "0" since the motor 20 is not driven, as shown FIG. 5.

In addition, as shown in FIG. 4, since the three-phase voltage whose output frequency f is lower than the minimum operating frequency fmin is supplied to the motor 20 to prevent the motor 200 from being driven, the DC link voltage Vdc may not be changed.

Thereafter, at the point t1 at which the control part 130 adjusts the output frequency f of the three-phase voltage to the minimum operation frequency fmin, as the motor 20 begins to be driven, the DC voltage Vdc begins to decrease.

At this time, the control part 130 can adjust a hydraulic pressure of a pump actuated by the motor 20 to a predetermined hydraulic pressure or more by driving while keeping the output frequency f of the three-phase voltage supplied to the motor 20 for a predetermined period of time.

In this embodiment, the predetermined period of time may be varied depending on the pump installation environments.

Next, the control part 130 compares the DC link voltage Vdc with the minimum operating voltage Vmin of the motor 20 after the predetermined period of time and increases the output frequency f of the three-phase voltage by a first frequency or decreases it by a second frequency based on a result of the comparison.

More specifically, as a result of the comparison between the DC link voltage Vdc and the minimum operating voltage Vmin, if the DC link voltage Vdc exceeds the minimum operating voltage Vmin, the control part 130 can increase the output frequency f of the three-phase voltage by the first frequency.

Conversely, as a result of the comparison between the DC link voltage Vdc and the minimum operating voltage Vmin, if the DC link voltage Vdc is equal to or lower than the minimum operating voltage Vmin, the control part 130 can decrease the output frequency f of the three-phase voltage by the second frequency.

In this embodiment, the minimum operating voltage Vmin may be a minimum voltage value of the voltage supplied to drive the motor 20. The minimum operating voltage Vmin may be set differently depending on the rated specifications of the motor 20.

That is, when the DC link voltage Vdc applied to the DC links DCP and DCN is higher than the minimum operating voltage Vmin, the motor 20 can be driven.

In the meantime, the first frequency may be set as a frequency value to minimize a rapid change in the DC link voltage Vdc, which may be caused by the adjustment of the output frequency f. For example, the first frequency may be 5 Hz.

In addition, the first and second frequencies may be frequencies proportional to a preset constant. For example, the first frequency may be twice as high as the second frequency.

The control part 130 can delay a time of a change in the output W of the motor 20 and the DC link voltage Vdc, which may be caused by the change in the output frequency f, by keeping the adjusted output frequency f for a preset waiting time after the adjustment of the output frequency f of the three-phase voltage.

As shown in FIG. 3, the control part 130 increases the output frequency f of the three-phase voltage by the first frequency during a t1 to t2 interval and compares the DC link voltage Vdc, which is decreased with the increase in the output frequency f of the three-phase voltage, with the minimum operating voltage Vmin.

As shown in FIG. 4, as a result of the comparison between the DC link voltage Vdc and the minimum operating voltage Vmin, since the DC link voltage Vdc exceeds the minimum operating voltage Vmin until point t2, the control part 130 increases the output frequency f of the three-phase voltage by the first frequency until point t2.

Thereafter, from point t2, as a result of the comparison between the DC link voltage Vdc and the minimum operating voltage Vmin, since the DC link voltage Vdc is equal to or lower than the minimum operating voltage Vmin, the control part 130 decreases the output frequency f of the three-phase voltage by the second frequency.

The control part 130 may repeat the above-described comparison between the DC link voltage Vdc and the minimum operating voltage Vmin and adjust the output frequency f of the three-phase voltage based on a result of the repeated comparison. Accordingly, the control part 130 can adjust the output frequency f of the three-phase voltage to the maximum while keeping an operating state where the DC link voltage Vdc exceeds the minimum operating voltage Vmin, such as during an interval after point t2. Accordingly, as shown in FIG. 5, the output W of the motor 20 can be kept at the maximum during the interval after point t2.

In other words, the inverter 100 according to one embodiment of the present invention can drive the motor 20 driven by electric energy of the solar power system 10 with the maximum power without using a separate controller and PID module for calculating a maximum power point tracking (MPPT) algorithm.

As a result, the inverter 100 according to one embodiment of the present invention can reduce an installation space and production costs which are required by a controller for calculating the MPPT algorithm and utilize a PID module for control of variables such as a flow rate, a pressure and the like used for a pump.

In another embodiment, as a result of the comparison between the DC link voltage Vdc and the minimum operating voltage Vmin, if the DC link voltage Vdc is equal to the minimum operating voltage Vmin, the control part 130 can keep the output frequency f of the three-phase voltage at the present frequency during a predetermined keeping period of time.

In another embodiment, the control part 130 may again compare the DC link voltage Vdc with the minimum operating voltage Vmin after keeping the output frequency f of the three-phase voltage at the present frequency during the predetermined keeping period of time.

Thus, the control part 130 can increase a period of time during which the motor 20 is driven with the maximum power.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An inverter for converting power and supplying the power to a motor, comprising:
   a measurement part configured to measure a DC link voltage applied to a DC link, wherein the DC link voltage is supplied from a solar power system and is configured to be nonlinearly changed depending on an output of the motor;
   a conversion part configured to convert the DC link voltage into a three-phase voltage and output the three-phase voltage to the motor; and
   a control part configured to make a comparison in magnitude between the DC link voltage and a minimum operating voltage of the motor, and adjust an output frequency of the three-phase voltage based on the comparison in magnitude to drive the motor at maximum power, wherein the DC link voltage and the minimum operating voltage are not a current, wherein the minimum operating voltage of the motor is a minimum voltage that is needed for the operation of the motor,
   wherein, if the DC link voltage exceeds the minimum operating voltage of the motor, the control part increases the output frequency of the three-phase voltage by a first frequency, and if the DC link voltage is less than or equal to the minimum operating voltage of the motor, the control part decreases the output frequency of the three-phase voltage by a second frequency which is lower than the first frequency.

2. The inverter according to claim 1, wherein the control part adjusts the output frequency to a minimum operating frequency of the motor at the time of start of operation of the motor.

3. The inverter according to claim 2, wherein, when the output frequency reaches the minimum operating frequency, the control part keeps the output frequency to be equal to or higher than the minimum operating frequency.

4. The inverter according to claim 1, wherein a ratio between the first frequency and the second frequency has a predetermined constant value.

5. The inverter according to claim 4, wherein the predetermined constant value between the first frequency and the second frequency is 2:1.

* * * * *